Figure 1:
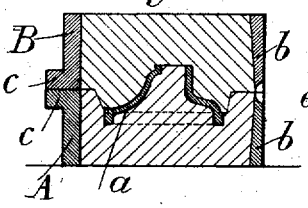

No. 12,760. REISSUED MAR. 10, 1908.

P. BONVILLAIN.

APPARATUS FOR USE IN MANUFACTURING SMALL METALLIC PATTERN PLATES.

APPLICATION FILED JAN. 4, 1908.

Witnesses:
Harvey L. Lecher
Archibald Martin

Inventor:
Philibert Bonvillain
by atty Paul Synnestvedt

THE NORRIS-PETERS CO., WASHINGTON, D. C.

UNITED STATES PATENT OFFICE.

PHILIBERT BONVILLAIN, OF PARIS, FRANCE, ASSIGNOR, BY MESNE ASSIGNMENTS, TO E. H. MUMFORD COMPANY, OF PHILADELPHIA, PENNSYLVANIA, A CORPORATION OF PENNSYLVANIA.

APPARATUS FOR USE IN MANUFACTURING SMALL METALLIC PATTERN-PLATES.

No. 12,760. Specification of Reissued Letters Patent. Reissued Mar. 10, 1908.

Original application filed July 29, 1904, Serial No. 218,626. Divided and this application filed March 14, 1905, Serial No. 250,067. Original No. 814,638, dated March 6, 1906. Application for reissue filed January 4, 1908. Serial No. 409,368.

*To all whom it may concern:*

Be it known that I, PHILIBERT BONVILLAIN, a citizen of the Republic of France, and a resident of 6 Rue Blanche, Paris, France, have invented certain new and useful Improved Apparatus for Use in Manufacturing Small Metallic Pattern-Plates, of which the following is a specification, this being a division of my application filed in the United States Patent Office July 29, 1904, under the Serial No. 218,626.

This invention relates to apparatus which, combined together, allow the rapid manufacture of small metallic-plates as used in multiple molding of small castings in foundries; but instead of making a duplex pattern-plate containing on one side the top of the multiple patterns and on the other side the bottom parts of same multiple patterns in which top and bottom of each pattern must correspond the new apparatus are so combined that they allow the making of small metallic pattern-plates reversible—*i. e.*, having the tops and bottoms of the pattern of one casting or multiple patterns of the same or different casting symmetrically disposed side by side. When ready, three, four or five or these small metallic-plates, according to size, are inserted in a special frame or pattern-plates table, which form thus assembled constitutes a complete multiple pattern-plate for use, and this multiple pattern has the enormous advantage of being variable at will—*i. e.*, when the number of copies of one pattern-plate is over the pattern-plate is taken off from the pattern-plate table and replaced instantaneously by another one, so that the molder never makes more molds than required of each pattern, which is not possible with the present solid multiple-pattern plate system. It is possible to mold at one time a series of pattern-plates conveniently assembled or juxtaposed; but it may occur that one of these may be required to be molded a less number of times than the others. One may then be withdrawn to obtain a sufficient number of moldings from it, and it may be replaced by another, whereas if the said pattern-plate were made solid with the others this would be impossible since there would necessarily result the same number of moldings from each pattern-plate.

In order that the invention may be more clearly understood, apparatus according thereto is illustrated, by way of example, in the accompanying drawings, in which:—

Figure 2:
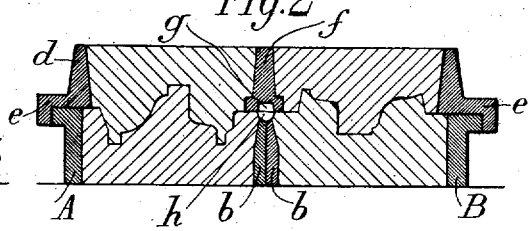
Figure 1A:
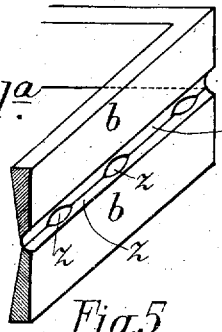
Figure 3:
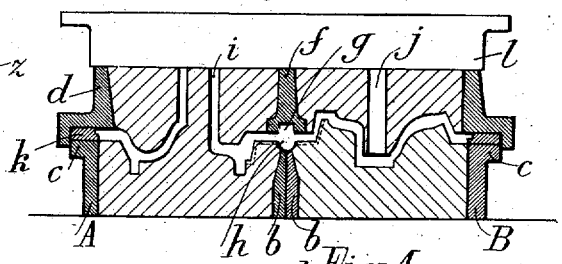
Figure 5:
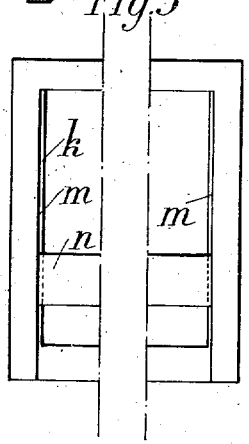
Figure 4:
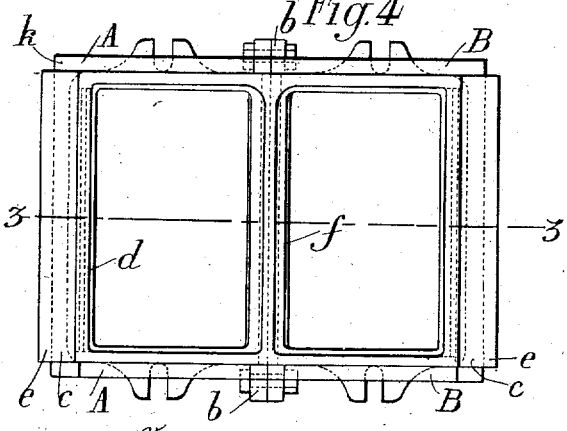
Figure 6:
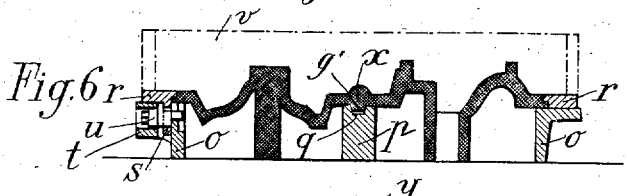
Figure 7:
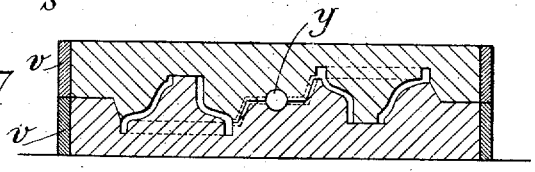

Figures 1 to 3 are sectional elevations in the direction of line 3 3 of Figure 4, of the mold-boxes employed for casting a molding-plate arranged in accordance with the successive stages of the operation. Figure 1[a] is a perspective view of part of two superposed frames. Figure 4 is a plan view of the apparatus shown in Figure 2. Figure 5 is a plan of a frame adapted to be inserted between the mold-boxes. Figure 6 is a sectional elevation of the cast molding-plate in its position on the molding-table, and Figure 7 is a sectional elevation of the molds obtained by means of the molding-plate in their connected position ready for casting.

These apparatus comprise—

First. Two special frames A and B, closed on their four sides, which when superposed form a complete molding-box, as shown in Figure 1. Side projections or flanges are provided to assemble them accurately together, either superposed, as in Figure 1, or placed side by side, as in Figures 2, 3 and 4. It must be noticed that the two sides (marked *b b* in both frames) are of a particular shape, as shown in Figure 1[a], and are provided with grooves to form when assembled together side by side a semicircular groove *h*, which forms the central line *x* of the molding-plate. (See Figures 2 and 3.) Besides, in the edges Z Z semicircular openings are cut at two or three points, as shown in Figure 1[a], in order to allow connections between the central and the lateral runners, but not sufficiently large to allow sand to escape when rammed by hand to form a mold.

Second. A special frame *d* with deep side flanges *e* accurately machined, so as to slide smoothly, but without any lateral play, on the frames A and B, assembled together side by side, as shown in Figures 2 and 3. This frame *d* has a central partition *f* of a special shape having a groove *g* provided to obtain on the back of the pattern-plate a rib *g'*, which insures the perfect accuracy of its axis of symmetry when inserted in the pattern-plates table.

Third. A special frame *k*, well machined, (so as to be of a perfect even thickness), which is inserted between the frames A and B, assembled side by side, and the frame *d* and serves to insure a regular even thickness in all the pattern-plates, which are then perfectly interchangeable. The frame *k* has its two internal longitudinal sides grooved, and on these grooves *m m* slides a rule *n*, which serves to limit the length of pattern-plates according to size of patterns or number of patterns included in each of them.

Fourth. Two cast-iron block-weights *l l*, well planed on their smaller flat surfaces, to load the whole apparatus when casting pattern-plates.

Fifth. A pattern-plates table *o*, which forms a multiple pattern-plate of which the parts are variable at will, pattern-plates being very easily inserted in it or taken out to be replaced by other pattern-plates when necessary in order to make only the strict number of copies required of each pattern.

How to make small metal molding-plates: To make a pattern-plate, a first copy of the pattern *a* is made in the ordinary way by means of frames A and B. (See Figure 1). The top part B, being lifted perfectly true and level from the part A, is placed side by side to it, and pattern *a* is taken off from the part A. Part A has the impression of the bottom and inside portion of pattern *a*, and B has the impression of the top or outside portion of same. This being done, the frame *d* is put on the top of the frames A and B, assembled together, as shown in Figure 2, and a layer of sand is rammed in it to give the exact counterpart of both above impressions. Frame *d* being removed by lifting it with great care, it is necessary to cut or take off from it part of the sand on all the vertical and inclined walls and to provide ribs wherever necessary to insure sufficient resistance to the pattern-plate to re-sist the pressure exerted on it when molding. This being done, the frame *k* is put into position, as shown in Figures 3 and 4, and on the top of it is placed the frame *d* in exactly the same position as before after having limited the length of the pattern-plate by placing a flat rule *n* at the right point, according to size of the pattern *a*. The sectional view in Figure 3 shows clearly the free space left for the metal that will form the pattern-plate, cylindrical annular openings, as shown at *i* and *j*, being provided to form parts to support the center parts of the pattern-plate in the operation of molding and prevent it from bending under pressure. Cast-iron blocks *l l* having been placed on the top of the frame *d*, planed surfaces downward and arranged to cover exactly the openings *i* and *j*, the metal is poured into the mold thus formed. The pattern-plate thus obtained has therefore on its upper surface two distinct impressions, one corresponding to the internal or top shape of the pattern *a*, while symmetrically disposed side by side is the internal or bottom shape of the same pattern *a*—*i. e.*, a small pattern-plate having on its medial line a half-round projection to form the runner in the mold with runners from the central part to the patterns and lateral ribs for fixing on the pattern-plate table. The opposite face of the pattern-plate has a shaped rib *g'*, formed by the groove *g*, which is to engage in a groove of similar shape on the pattern-plate table *o*, which determines the exact position of the pattern-plate. The pattern-plate thus made is ready to be inserted in the pattern-plate table *o*. To do this, the rib formed by the groove *g* and cylindrical and annular projections by the openings *i* and *j* are placed downward, the rib *g'* fitting exactly in the groove *q* on the central partition of the pattern-plate table *o*. (See Figure 6). Lugs *s* on a frame *r*, placed opposite lugs *t* of the pattern-plate table *o*, bear eccentric bolts *u*, which being revolved press bars *r* against the table and the edges of the pattern-plate, thus fixing it firmly. This being done, if we take two successive impressions of the pattern-plate thus obtained and if we put the second impression on the first one, left-hand side over right-hand side, we have two complete molds of pattern *a*. (See Figure 7). In this double mold the impressions left by the semicircular projections *x* in each of them are superposed on each other perfectly accurately, forming a cylindrical channel *y*, through which metal is poured into the mold. (See Figure 7).

Having now particularly described and ascertained the nature of my said invention and in what manner the same is to be performed, I declare that what I claim is:—

1. The complete apparatus for manufacturing pattern-plates used in foundries consisting of in combination, two similar frames having two faces and their edges machined, a frame adapted to cover the above mentioned frames and to fit on their edges and provided in the center with a rib at the bottom so as to come into position above the juxtaposed sides of the two other frames, a frame with lateral grooves adapted to be placed between the juxtaposed frames and the superposed frame and a rule or bar adjusted in the grooves of the said frame with lateral grooves, substantially as hereinbefore described and for the purpose specified.

2. Apparatus for manufacturing pattern-plates used in foundries, comprising a pair of similar frames having their edges and two side faces constructed for accurate fitting, a frame adapted to cover the said pair of frames when they are placed side by side, and means whereby the said frame may be supported with its edges spaced away from the opposing edges of the pair of frames.

3. Apparatus for manufacturing pattern-plates used in foundries, comprising a pair of similar frames having their edges and two side faces constructed for accurate fitting, a frame adapted to cover the said pair of frames when they are placed side by side, and provided in the center with a rib arranged to come opposite the juxtaposed sides of the pair of frames, and means whereby the said frame may be supported with its edges spaced away from the opposing edges of the pair of frames.

In testimony whereof I have hereunto signed my name in the presence of the two subscribed witnesses.

PHILIBERT BONVILLAIN.

Witnesses:
DEAN M. MASON,
JULIEN EAVERNE.